Oct. 20, 1936.  L. E. LA BRIE  2,057,724
BRAKE
Filed Oct. 2, 1933   2 Sheets-Sheet 1
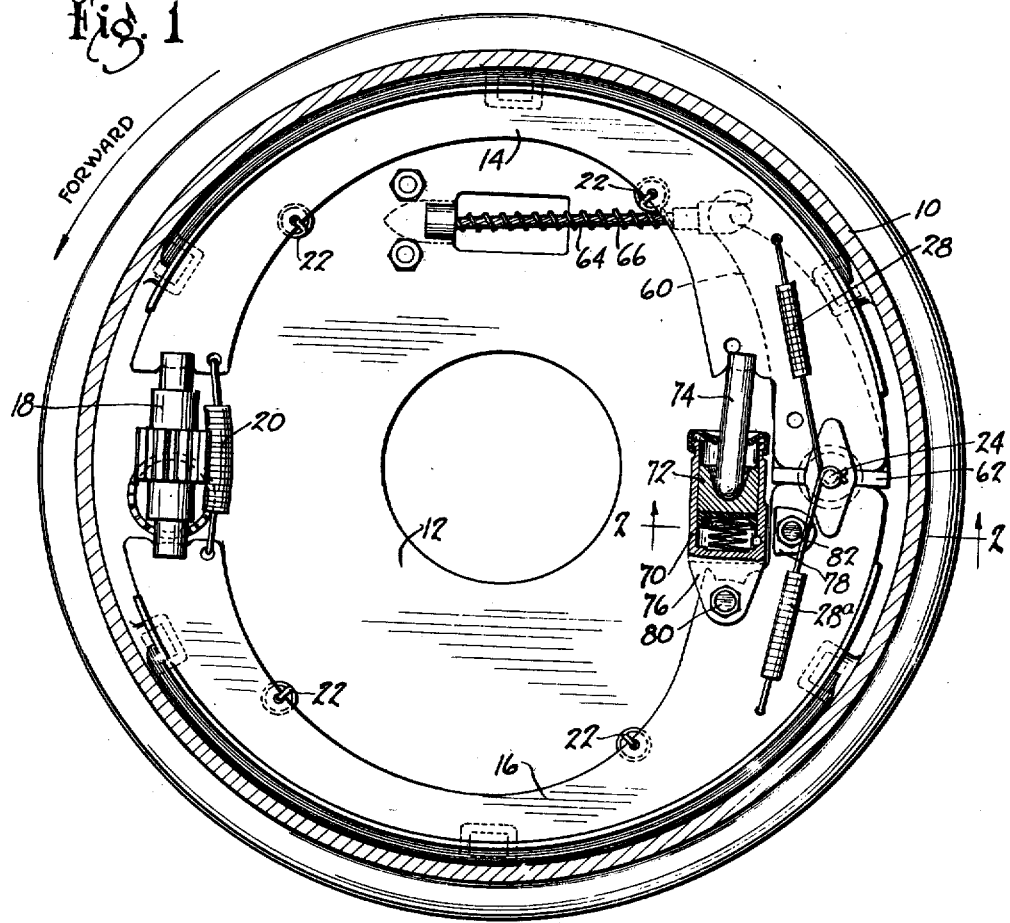
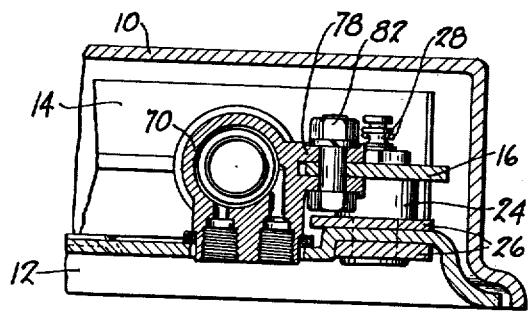
INVENTOR.
Ludger E. LaBrie
BY Jerome R. Cox
ATTORNEY

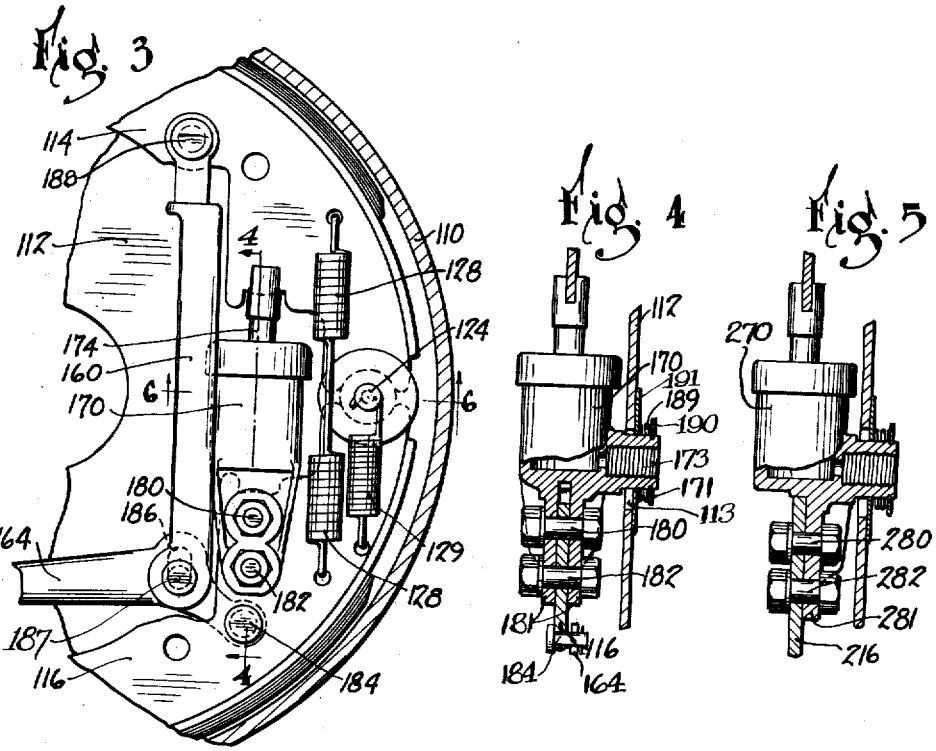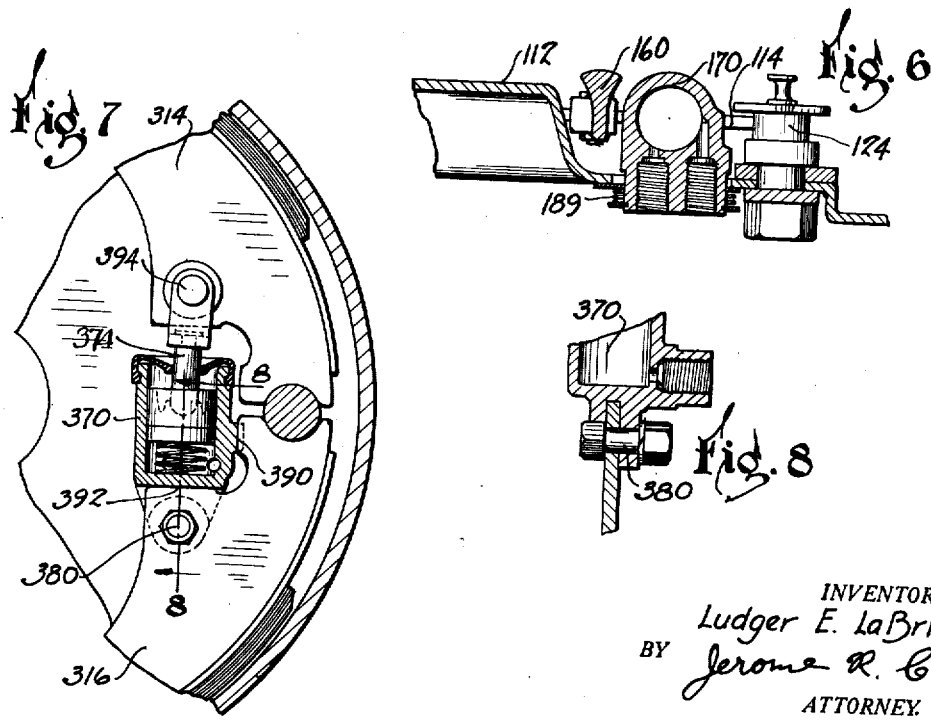

Patented Oct. 20, 1936

2,057,724

UNITED STATES PATENT OFFICE 2,057,724

BRAKE

Ludger E. La Brie, South Bend, Ind., assignor to Bendix Aviation Corporation, South Bend, Ind., a corporation of Delaware Application October 2, 1933, Serial No. 691,746

12 Claims. (Cl. 188—106)

This application is in part a continuation of my copending application 495,809 filed November 15, 1930. It relates to brakes and is illustrated as embodied in an internal expanding brake of the shiftable anchorage type.

An object of the invention is to provide balanced applying means to thrust apart the ends of this type of brake with equal force.

A further object of the invention is to provide a fluid cylinder as such balanced applying means, in combination with means for loading the brake elements constructed and arranged to cooperate with the elements of the brake, the anchor and the cylinder in maintaining the cylinder normally stationary and in maintaining, except on rare occasions, a constant engagement between the secondary shoe which carries the fluid power cylinder and the anchor.

In one desirable arrangement a fluid motor is carried by the secondary shoe and is arranged to force the braking elements apart with equal force, the return springs of the brake being constructed and arranged to maintain the secondary shoe in anchoring engagement until drum contact is effected irrespective of the direction of drum rotation.

Other objects and features and other novel desirable constructions will be apparent from the following description of the illustrated embodiments shown in the accompanying drawings, in which:

Figure 1 is a vertical section through the brake just inside of the head of the brake drum and showing the brake shoes in side elevation;

Figure 2 is a sectional view taken substantially on the line 2—2 of Figure 1;

Figure 3 is a fragmentary sectional view similar to a portion of Figure 1 and showing a modified form;

Figure 4 is a sectional view taken substantially on the line 4—4 of Figure 3;

Figure 5 is a view similar to Figure 4 showing a slight modification;

Figure 6 is a sectional view taken substantially on the line 6—6 of Figure 3;

Figure 7 is a view similar to Figure 3 showing another modification; and

Figure 8 is a sectional view taken substantially on the line 8—8 of Figure 7.

The brake includes a rotatable drum 10 at the open side of which is arranged a support such as a backing plate 12 and within which is arranged the brake friction means. The latter is illustrated as including a pair of shoes 14 and 16 connected by an adjustable floating joint 18 which in the form shown, includes a right-and-left hand threaded member seated in correspondingly threaded sockets having slotted bases to embrace the shoe ends.

The shoes may be held against the adjustment by a tensioned spring 20. Suitable steady rests 22 may be provided for the shoes.

Preferably a flat sided anchor 24 is fixedly secured to the backing plate (reinforced if necessary, by stampings 26) between the shoes, the arrangement being such that when the drum is turning clockwise the shoe 14 anchors thereagainst, while, if the drum is turning counterclockwise, the shoe 16 anchors thereagainst.

The brake is intended to be applied by either of two controls, viz. a fluid power control for service purposes and a mechanical control for emergency and parking purposes. Broadly, this type of combination of applying means for a shiftable anchorage brake is disclosed and claimed in my prior co-pending application 491,589, filed October 27, 1930.

The mechanical means is in the form of a floating lever 60 having thrust projections 62 extending between the shoe ends on opposite sides of the anchor 24. The upper end of the lever is connected to and actuated by a cable 64 shown surrounded by a return spring 66. Cable 64 extends through an opening in the backing plate and through a Bowden conduit and is connected by any suitable means to a hand brake lever.

The fluid control includes a hydraulic cylinder 70 bolted rigidly to the web of the shoe 16 and containing a single piston 72 pivotally engaged by the rounded end of a piston rod 74. Rod 74 is slotted across its end to embrace and pivotally engage the end of the web of shoe 14. I have shown in Figure 1 two return springs 28 and 28a tensioned between the respective shoes and the anchor 24, the lower spring 28a preferably being stronger than the upper one. The cylinder 70 is provided with ears 76 and 78. Bolts 80 and 82 pass through the ears and secure the cylinder firmly to the shoe 16.

In operation the fluid pressure of the motor forces the toe of shoe 14 toward the drum, shoe 16 remaining anchored by virtue of the loading effect of its relatively strong spring 28a. During this lining clearance takeup phase of brake operation, the lower portion of shoe 14 also remains in contact with the anchor. This is due to the contacting contours of the shoe and anchor.

With counterclockwise rotation of the drum, the relative strength of the springs 28 and 28a obviates click from the auxiliary shoe 16 by maintaining the shoe anchored during the lining clearance takeup. The shoe 14 in this case is the driving or servo shoe.

It is to be particularly noted that inasmuch as counterclockwise rotation of the drum corresponds to forward motion of the vehicle, the shoe 16 is maintained anchored and stationary not only when the brake is released, but also during about 90% of the brake applications. Thus the cylinder 70 is maintained stationary substantially all of the time and the hose leading thereto is substantially free of movement. This type of cylinder with only one piston is advantageous over the conventional type of cylinder with two pistons, in that it is lighter and cheaper and in that it has only one-half of the surface or area liable to leakage of the actuating liquid. Heretofore, it has seemed disadvantageous to use this type of cylinder because of the movement thereof in brake application and consequent bending and wear on the hose supplying liquid thereto. However, when used in combination with a brake of the duo servo type and when secured firmly to the secondary shoe of this brake, the arrangement becomes very efficient.

In the embodiment shown in Figures 3, 4, and 6, the cylinder 170 is provided with a pair of projections 181 which are secured to the shoe 116 by bolts 180 and 182, the bolts being in line with each other. The cylinder acts through the piston rod 174 on the shoe 114. The springs 128 are of substantially equal strength and an extra spring 129 is secured to the anchor 124 and the shoe 116 so as to insure that the shoe 114 leaves the anchor first in braking, and is always maintained in contact except when carried away from the anchor by the drum 110 when the latter is being braked while moving clockwise.

The cylinder 170 is provided with an integral boss 171 formed with a bore 173 in which there is normally secured a hydraulic brake fluid hose and the fluid for actuating the brake is supplied through this bore. The boss 171 extends through an oversized hole 113 in the backing plate 112 and thus may shift when the cylinder shifts in reverse braking. The boss 171 is positioned at one end of the cylinder so that the supplied fluid will always enter the cylinder inward of the piston regardless of the position of the piston.

The alternate means for applying the brakes comprises a lever 164 pivoted at 184 on the shoe 116 and having a slot 186 formed therein through which there extends a pin 187 connecting the lever 164 to the strut link 160 which is pivoted to the shoe 114 at 188. A spring 189 (see Figure 4) bearing on the backing plate 112 and on a washer secured to the inlet projection of the cylinder 170 aids in positioning the cylinder and preventing rattling.

The spring 189 bears at its outer end on a washer 190 fastened to the outer end of the boss 171 and at its inner end on a slidable cover plate 191 which covers the opening 113 in the backing plate 112. The spring and washer not only aid in positioning the cylinder but also maintain the cover plate 191 in position to cover the opening 113.

In the embodiment shown in Figure 5, the cylinder 270 is provided with only a single offset projection 281 instead of the double projections provided for the cylinder 170 and is secured to the shoe 216 by bolts 280 and 282 which pass through the shoe 216 and the projection 281.

In the modification shown in Figures 7 and 8, the cylinder 370 is provided with a slotted abutment 390 and with a flat face 392 which fit snugly against corresponding portions on the shoe 316. The single bolt 380 is therefore sufficient to hold the cylinder 370 securely and rigidly to the shoe 316. The piston rod 374 is pivoted to the shoe 314 at 394.

As to the invention shown in Figures 3 to 8 inclusive, this application is subsequent to Taylor application, Serial No. 546,803, but as to the invention shown in Figures 1 and 2 of this application, this application is prior to said Taylor application.

It is to be understood that the above described embodiments of my invention are for the purpose of illustration only and various changes may be made therein without departing from the spirit and scope of the invention.

I claim:

1. A brake comprising a drum in combination with friction means anchoring at one end when the drum is turning in one direction and at the other end when the drum is turning in the other direction, a floating lever having thrust parts arranged between said ends of the friction means, a cylinder engaging the friction means near one of said ends, and a piston in the cylinder engaging the friction means near the other of said ends.

2. A brake friction device comprising a pair of shoes, a cylinder rigidly mounted on one of said shoes adjacent an end thereof, a piston in the cylinder, a piston rod pivotally engaging the piston at one end and at its other end pivotally engaging an end of the other shoe, together with means within the brake and acting upon the shoes for insuring a constant contact of the shoe carrying the cylinder with the anchor during the lining clearance takeup phase in the application of the brake.

3. A brake friction device comprising a primary shoe and a secondary shoe, a cylinder rigidly mounted on said secondary shoe adjacent an end thereof, a piston in the cylinder, a piston rod pivotally engaging the piston at one end and at its other end pivotally engaging an end of the other shoe, together with means acting upon the shoes for insuring a constant contact of the secondary shoe with the anchor during the lining clearance takeup phase in the application of the brake.

4. A brake comprising a drum, a friction means anchoring at one end when the drum is turning in one direction and at the other end when the drum is turning in the other direction, a spring connecting the ends of said friction members, a second spring secured to one of said ends and to a non-rotating part, and a fluid cylinder secured to one of said ends.

5. A brake comprising a drum, a friction means anchoring at one end when the drum is turning in one direction and at the other end when the drum is turning in the other direction, a spring connecting the ends of said friction members, a second spring secured to one of said ends and to a non-rotating part, and a fluid cylinder secured to the end to which said last named spring is secured.

6. A brake comprising a drum, a friction means anchoring at one end when the drum is turning in one direction and at the other end when the drum is turning in the other direction, a cylinder secured to one of said ends, a piston in said cylinder, a piston rod bearing at one end on said piston and at the other end on the end of the friction means opposite to the cylinder, a lever pivoted to the cylinder end of the friction means, and a strut link having one end in operative connection with the lever and the other end in operative connection with the end of the friction means opposite to the cylinder.

7. A brake comprising a drum, a primary shoe, a secondary shoe, a cylinder secured to the secondary shoe, a lever pivoted to the secondary shoe, a piston in the cylinder, a piston rod operatively connecting the piston and the primary shoe, and a strut link operatively connecting the lever and the primary shoe.

8. A brake comprising a drum, a friction element therein formed adjacent to one end with a pair of flat portions perpendicular to each other, a fluid cylinder formed with a pair of flat portions perpendicular to each other contacting with said friction element flat portions, and a bolt secursaid cylinder to said element.

9. A brake comprising a drum, a backing plate formed with a slot, a friction element, a fluid cylinder secured to said friction element and having an inlet projection extending through said slot, a washer secured to said projection, and a spring compressed between said washer and said backing plate.

10. A brake for an automotive vehicle comprising a friction device arranged to anchor on one end when the vehicle is moving forward and on the opposite end when the vehicle is moving backward, a cylinder supported by the end of said friction device on which it anchors when the vehicle is moving forward, an anchor between said ends on which the friction device anchors, means holding the end on which the cylinder is supported more strongly against the anchor than said other end, and fluid pressure means in said cylinder which acts on said friction device to apply the brake.

11. A brake comprising a drum, a friction means anchoring at one end when the drum is turning in one direction and at the other end when the drum is turning in the other direction, an anchor pin between said ends, a spring connecting the ends of said friction members, a second spring secured to one of said ends and to said anchor pin and a fluid cylinder secured to one of said ends.

12. A brake comprising a drum, a friction means anchoring at one end when the drum is turning in one direction and at the other end when the drum is turning in the other direction, an anchor pin between said ends, a spring connecting the ends of said friction members, a second spring secured to one of said ends and to said anchor pin and a fluid cylinder secured to the end to which said last named spring is secured.

LUDGER E. LA BRIE.